（12）United States Patent
Fisher et al.

(10) Patent No.: US 10,001,002 B2
(45) Date of Patent: Jun. 19, 2018

(54) PARTICLE DUST CONTROL WITH LIQUID BINDING AGENTS

(71) Applicant: Halliburton Energy Services, Inc., Houston, TX (US)

(72) Inventors: Chad Adam Fisher, Duncan, OK (US); Calvin Lynn Stegemoeller, Duncan, OK (US); Wesley John Warren, Marlow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 677 days.

(21) Appl. No.: 14/513,317

(22) Filed: Oct. 14, 2014

(65) Prior Publication Data

US 2016/0102540 A1  Apr. 14, 2016

(51) Int. Cl.
| | |
|---|---|
| *E21B 43/267* | (2006.01) |
| *C09K 3/22* | (2006.01) |
| *B65G 69/06* | (2006.01) |
| *B65G 47/18* | (2006.01) |
| *B65G 33/14* | (2006.01) |

(Continued)

(52) U.S. Cl.
CPC ............ *E21B 43/267* (2013.01); *B65G 33/14* (2013.01); *B65G 33/24* (2013.01); *B65G 47/18* (2013.01); *B65G 69/06* (2013.01); *B65G 69/188* (2013.01); *C09K 3/22* (2013.01)

(58) Field of Classification Search
CPC ........ B65G 33/14; B65G 33/24; B65G 47/18; B65G 69/06; B65G 69/188; C09K 3/22; E21B 43/267
See application file for complete search history.

(56) References Cited

U.S. PATENT DOCUMENTS 4,439,211 A * 3/1984 Anderson .............. B08B 15/00
                                                    134/25.1
5,069,723 A * 12/1991 Cole, Jr. .............. B65G 69/188
                                                    134/25.1
(Continued)

FOREIGN PATENT DOCUMENTS

GB       1022129 A    3/1966
GB       2027611 A    2/1980

OTHER PUBLICATIONS

European Search Report received in corresponding EP Application No. 14189056, dated Jul. 22, 2016.

*Primary Examiner* — Leslie A Nicholson, III
*Assistant Examiner* — Keith R Campbell
(74) *Attorney, Agent, or Firm* — McDermott Will & Emery LLP

(57) ABSTRACT

Methods including placing particles that are substantially dry in a hopper; conveying the particles from the hopper via a conveyance to an open-air gap; adding a fluid to the particles in the hopper, the particles in the conveyance, or both, thereby reducing an amount of a dust produced at the open-air gap. The particles may be sand, silica, gravel, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof.

11 Claims, 3 Drawing Sheets

(51) Int. Cl.
*B65G 33/24* (2006.01)
*B65G 69/18* (2006.01)

(56) References Cited

U.S. PATENT DOCUMENTS

| | | | |
|---|---|---|---|
| 5,622,561 A * | 4/1997 | Cummins | B01F 13/0013 |
| | | | 118/303 |
| 6,962,200 B2 * | 11/2005 | Nguyen | C09K 8/62 |
| | | | 166/280.2 |
| 7,032,667 B2 * | 4/2006 | Nguyen | C09K 8/805 |
| | | | 166/280.2 |
| 7,258,922 B2 * | 8/2007 | Hesse | B32B 7/02 |
| | | | 106/31.97 |
| 8,636,832 B2 | 1/2014 | Stutzman et al. | |
| 9,267,063 B2 * | 2/2016 | Wolff | C09K 3/22 |
| 2006/0289827 A1 * | 12/2006 | Stone | C09K 3/22 |
| | | | 252/88.1 |
| 2008/0128131 A1 * | 6/2008 | Nguyen | E21B 43/267 |
| | | | 166/280.2 |
| 2011/0272511 A1 * | 11/2011 | Hall | B02C 21/026 |
| | | | 241/101.2 |
| 2013/0233545 A1 * | 9/2013 | Mahoney | C09K 8/80 |
| | | | 166/280.2 |

* cited by examiner

PARTICLE DUST CONTROL WITH LIQUID BINDING AGENTS

BACKGROUND

The present application relates to dust control during particle handling at a well site.

Subterranean wells (e.g., hydrocarbon producing wells, water producing wells, and injection wells) are often stimulated by hydraulic fracturing treatments where the fractures are formed in a subterranean formation and held open with particles (also referred as "proppant") to enhance fluid conductivity through the formation. Often, many tons of particles are used in a fracturing operation. Such particles are also used during gravel packing operations to control sand production in a subterranean formation during production, for example. As used herein, the term "particle" refers collectively to proppant particles, gravel particles, and any other solid particles that may be used in a subterranean formation operation.

When preparing particles at the surface of the well site for use in an operation, large amounts of dust can be created by the movement of particles, thereby creating inhalation hazards. For example, a common particle (e.g., proppant particle, gravel particle, and the like) is sand, which produces silica dust that is associated with a lung disease known as silicosis, or Potter's rot. Silicosis is a type of pneumoconiosis that manifests as inflammation and scarring in forms of nodular lesions in the upper lobes of the lungs.

A particle-handling apparatus a piece of particle-handling equipment that can produce dust. Generally, a hopper is used to receive particles from bags or another storage/transportation system. The hopper feeds a conveyance (e.g., a screw auger) that conveys the particles to a mixer, which is generally where water and other additives (e.g., viscosifiers, surfactants, friction reducers, resins, tackifiers, and the like) may be mixed with the particles, such as to form the proppant slurry when the particles are proppant particles. The particle-handling apparatus is typically configured such that the particles drop from the conveyance into the mixer in an open-air arrangement. Such a configuration allows workers to monitor the contents of the mixer and add materials thereto. However, this configuration also forms a significant amount of dust, which, when coupled with worker proximity during operation, creates a substantial exposure risk.

Dust control is very rarely used with a particle-handling apparatus, despite the significant amount of dust that is typically formed. When dust control measures are used, they are most commonly in the form of a covering, like a tarp, to enclose the portion of the apparatus where the particles fall from the conveyance to the mixer (e.g., at the tub inlet). In some instances, a vacuum system with a hose under the covering is also used to capture the dust. While this reduces the dust exposure risk to workers, the covering can also eliminate the workers' access to the mixer.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application relates to dust control during particle handling at a well site. More specifically, embodiments described herein utilize a liquid binding agent to mitigate dust formation between the conveyance and the mixer of a particle-handling apparatus.

The embodiments described herein combine particles with a liquid binding agent before, for example, the particles transfer from a conveyance to a mixer of a particle-handling apparatus. Without being limited by theory, it is believed that the liquid binding agent increases the adhesion of the fine particulates to the larger particles, so that when the particles transfer from the conveyance to the mixer dust formation is mitigated. In some instances, particles (e.g., gravel particles, proppant particles, and the like) produced from natural materials (e.g., sand or ground minerals) may be more susceptible to dust formation. The amount of dust produced may be measured, for example, using a dust meter, which typically uses light scattering methods to analyze the concentration of particulates in the air or a sample thereof.

Figure 1:
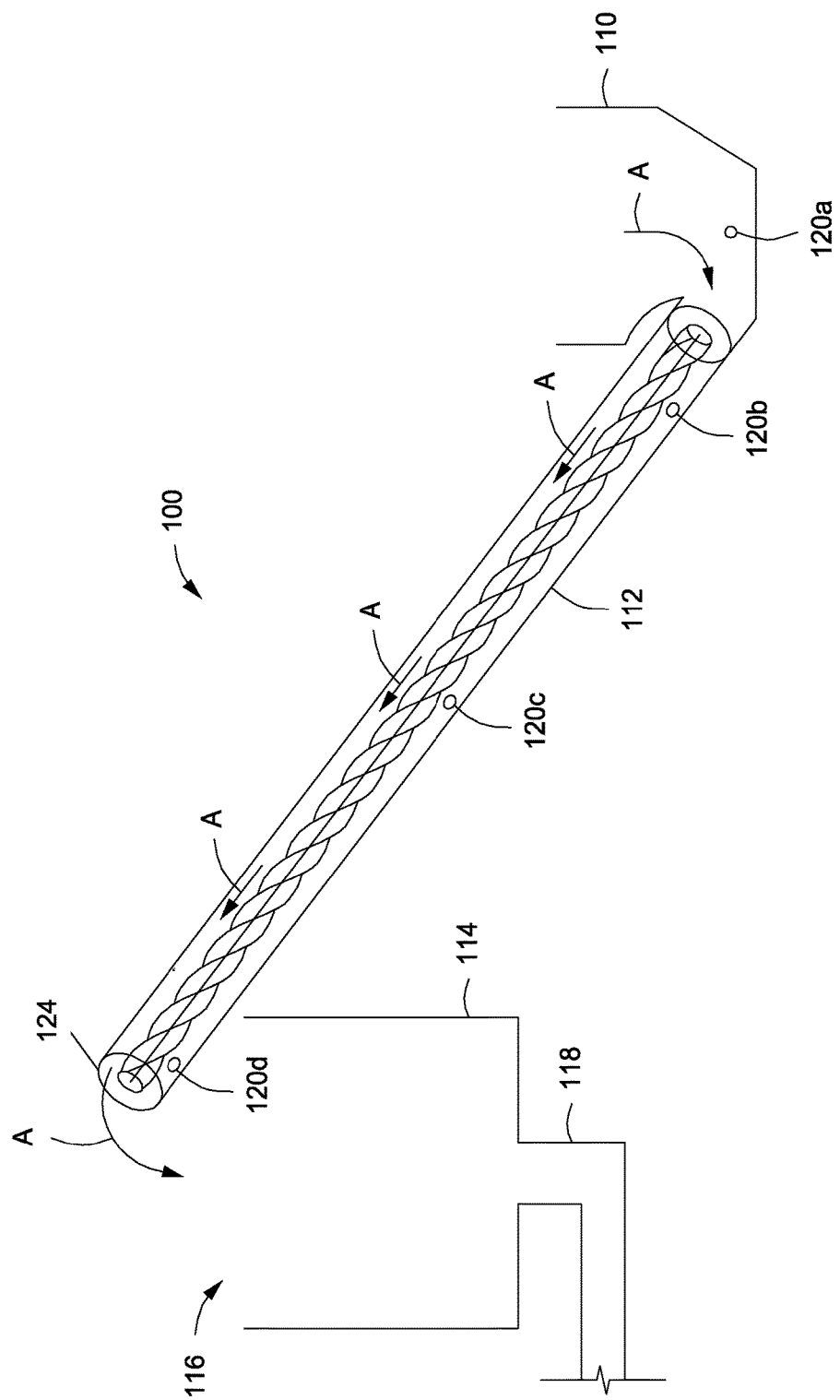
FIG. 1 provides an illustrative representation of a portion of a particle-handling apparatus suitable for use in treating particles with liquid binding agent to mitigate the formation of dust.

FIG. 1 provides an illustrative representation of a portion of a particle-handling apparatus 100 suitable for use in treating particles (e.g., proppant particles, gravel particles, and the like) with liquid binding agent to mitigate the formation of dust. The apparatus 100 includes a hopper 110 coupled to a conveyance 112 (illustrated as a screw auger (e.g., a metering screw) but may be any other suitable conveyance like a tubular drag conveyor, a metered gate, a belt conveyor, and the like). Dry particles or substantially dry particles may be added to the hopper 110. As used herein, the term "dry" refers to a material that does not have any additional liquid (e.g., water) added thereto and any liquid associated with the material is no greater than would be provided for given the current conditions (e.g., temperature, humidity, etc.).

As used herein, the term "dry particles" refers to particles (e.g., proppant particles, gravel particles, and the like) having no more liquid associated therewith than the amount of water that would be associated therewith at standard ambient temperature and pressure (SATP), a temperature of 298.15 K (25° C., 77° F.) and an absolute pressure of 100 kPa (14.504 psi, 0.987 atm) at 100% relative humidity. As used herein, the term "substantially dry particles" refers to particles (e.g., proppant particles, gravel particles, and the like) wherein the particle weight has increased, due to liquid addition, over the dry particle weight by an amount equal to or less than 10%.

The conveyance 112 may transport particles from the hopper 110 to the mixer 114 as illustrated by arrows A where there is an open-air gap 116 between the conveyance 112 and the mixer 114. Although the open-air gap 116 is depicted as allowing the particles to be deposited into the mixer 114, it will be appreciated that the open-air gap 116 may lead to any type of container or equipment that is capable of receiving the particles, without departing from the scope of the present disclosure (e.g., another particle-handling apparatus, as described below, a storage container, a mixer, a metering apparatus, a conveyer, and the like). The particles may then be mixed in the mixer 114 with a carrier fluid. In some instances, the carrier fluid may include various additives (e.g., viscosifiers, surfactants, friction reducers, resins, tackifiers, and the like) to produce a particle slurry that is conveyed to downstream equipment via the flow line 118 and eventually a subterranean formation. The mixer 114 may be any shape or size suitable for use in a particular operation, without departing from the scope of the present disclosure.

As illustrated, the system includes several fluid ports 120a-d before the open-air gap 116 between the conveyance 112 and the mixer 114. Specifically, the hopper 110 includes a fluid port 120a proximal to the conveyance 112 relative to an inlet 122 of the hopper 110. Further, the conveyance 112 includes a fluid port 120b proximal to the hopper 110 relative to the conveyance outlet 124, a fluid port 120c at about the midpoint between the hopper 110 and the conveyance outlet 124, and a fluid port 120d proximal to the conveyance outlet 124 relative to the hopper 110. A liquid binding agent may be added (e.g., continuously or intermittently) to the particles using one or more of the illustrated ports 120a-d.

In alternate embodiments, the one or more fluid ports may be located anywhere along the particle-handling apparatus before the conveyance outlet, including any location axial relative to the conveyance 112. Depending on the particle material and size, fluid ports proximal to the inlet of the hopper relative to the conveyance may be undesirable if the liquid binding agent causes the particles to clump or aggregate and adversely affect feeding of the particles from the hopper 110 to the conveyance 112. Having a fluid port (e.g., fluid port 120a of FIG. 1) proximal to the conveyance relative to an inlet of the hopper may allow for the dry particles above the fluid port to apply sufficient pressure or weight to mitigate issues relating to clumping or aggregation of the particles.

Additionally, while FIG. 1 illustrates a total of four fluid ports, a particle-handling apparatus disclosed herein may include any number of fluid ports (e.g., 1 to 10 or more). In some instances, a particle-handling apparatus may have multiple fluid ports where during operations only some are used and others are plugged or closed.

In some instances, the particle-handling apparatus 100 of FIG. 1 may be adapted to include other equipment. For example, a mulling device may be included in the hopper 110 or between the hopper 110 and the conveyance 112.

Figure 2:
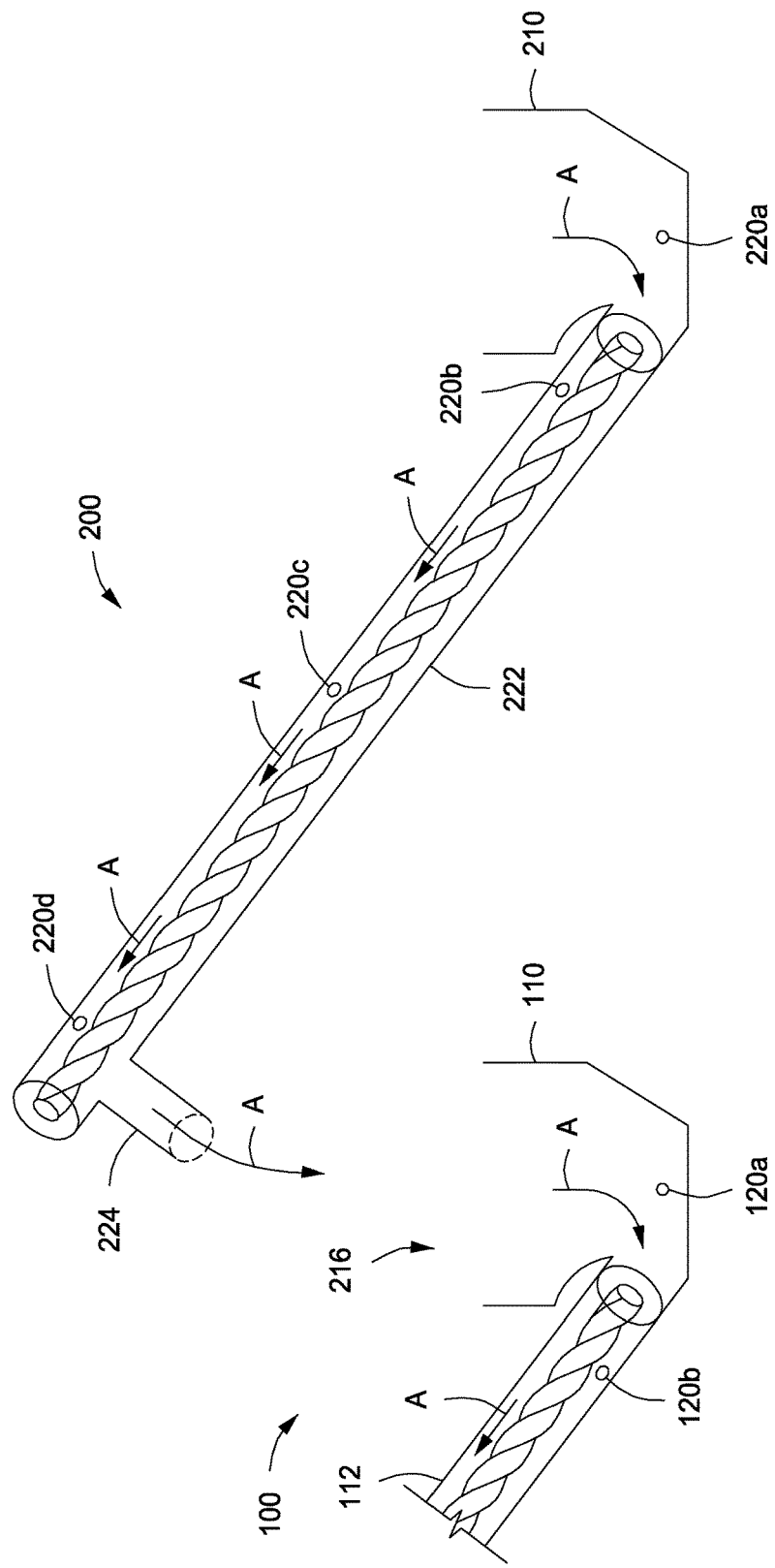
FIG. 2 provides an illustrative representation of a portion of a particle-handling apparatus suitable for use in treating particles with liquid binding agent to mitigate the formation of dust.

In some embodiments, the particle-handling apparatus described herein may be a transfer apparatus that does not directly operate to convey the particles herein (e.g., proppant particles, gravel particles, and the like) to a mixer. For example, with reference to FIG. 2 and continued reference to FIG. 1, the particle-handling apparatus may be a transfer screw 200 (i.e., transfer screw 200 is a type of particle-handling apparatus described herein). Such transfer screw may operate in tandem with a traditional metering screw for delivering the particles to a mixer or may operate, as shown in FIG. 2, with the particle-handling apparatus of FIG. 1, for example to increase the accessibility of the liquid binding agent to the particles.

The transfer screw 200 may be used to transfer particles from one or more various locations (e.g., one or more storage tanks), for example. The transfer screw 200, as depicted, includes a transfer hopper 210 and a transfer conveyer 222. As shown, an open-air gap 216 may exist between the transfer conveyer 212 and the hopper 110 of FIG. 1. Particles A may be introduced into the transfer hopper 210, conveyed by the transfer conveyance 212 and deposited past the open-air gap 216 and into the hopper 110 of FIG. 1 through a transfer conveyance outlet 224. Although the transfer conveyance outlet 224 is depicted as an angled protrusion extending from the transfer conveyance 212, other configurations may also be used without departing from the scope of the present disclosure. For example, the conveyance 212 may be open ended to permit the particles A to flow therefrom and into the hopper 110 of FIG. 1. In other embodiments, the conveyance 212 may have both an open end and a protrusion for allowing the particles A to flow therefrom, without departing from the scope of the present disclosure.

Similar to conveyance 112 of FIG. 1, transfer conveyance 212 may include several fluid ports 220a-d before the open-air gap 216. As depicted, four fluid ports 220a-d are shown in a configuration similar to fluid ports 120a-d of FIG. 1. However, such fluid ports may be in any configuration (e.g., at any location along the transfer screw 200 and in any number) and may be of any size suitable for a particular operation. A liquid binding agent may be added (e.g., continuously or intermittently) through one or more of the fluid ports 220a-d, as illustrated. Additionally, one or more of the fluid ports 220a-d may be plugged or otherwise obstructed or partially closed.

The amount of liquid binding agent used to treat the particles (e.g., the proppant particles, the gravel particles, and the like) may depend on, inter alia, the composition of the liquid binding agent, the composition of the particles, the size of the particles, the feeding rate from the hopper to the conveyance, and the like. In some embodiments, an amount of the liquid binding agent added to the particles may be less than about 3% (e.g., less than about 3%, 2.5%, 2%, 1.5%, 1%, 0.5%, 0.1%, 0.01%, 0.001%, and the like) by weight of the particles, encompassing any subset therebetween. In some embodiments, the liquid binding agent added to the particles may be between about 0.1% and about 1%, or 0.1% and about 0.5% by weight of the particles.

A liquid binding agent suitable for use in conjunction with the particle-handling apparatus and methods described herein may include a liquid that would normally be added to a mixer (e.g., a carrier fluid, a liquid additive, or an additive dispersed in a fluid) or any other suitable liquid. Generally, the liquid binding agent should be selected to not interfere or minimally interfere with the particles or any components of a particle slurry. For example, when a tackifier is included in the slurry to coat the particles, the liquid binding agent should not or should minimally affect the ability for the tackifier to coat the particles.

Exemplary liquid binding agents may include, but are not limited to, water, salt water, brine, an aqueous miscible fluid (e.g., an alcohol, a glycol, a glycerin, and the like), an oil-based fluid (e.g., an alkane, an olefin, an aromatic organic compound, a cyclic alkane, a paraffin, a diesel fluid, a mineral oil, a desulfurized hydrogenated kerosene, and the like), and the like. In some instances, the use of an oil-based fluid or an aqueous miscible fluid may be beneficial in cold climates, such as when aqueous-based fluids might experience freezing. Another example of a liquid binding agent may be consolidating agents dispersed in a fluid. Suitable consolidating agents may include, but are not limited to, non-aqueous tackifying agents (e.g., polyesters, polycarbonates, silyl-modified polyamide compounds, polycarbamates, urethanes, and natural resins such as shellac), aqueous tackifying agents (e.g., acrylic acid polymers, acrylic acid ester polymers, methacrylic acid polymers, and acrylamidomethyl-propane sulfonate polymers), silyl-modified polyamide compounds, resins (e.g., two-component epoxy-based resins, furan-based resins, phenolic-based resins, and phenol/phenol formaldehyde/furfuryl alcohol resins), crosslinkable aqueous polymer compositions (e.g., carboxylate-containing polymers and acrylamide-containing polymers), polymerizable organic monomer compositions, zeta-potential modifying aggregating compositions (e.g., a reaction product of an amine and a phosphate ester), and silicon-based resins (e.g., polysiloxanes and compounds comprising an organofunctional polysiloxane polymer). Such consolidating agents may optionally be emulsified. Combinations and/or derivatives of these also may be suitable.

In some instances, the liquid binding agent may be non-tacky at room temperature. In some instances, the liquid binding agent may be tacky at room temperature.

Particles suitable for use in conjunction with the particle-handling apparatus and methods described herein may comprise any material suitable for use in subterranean operations. Suitable materials for these particles include, but are not limited to, sand, silica, gravel, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particle size generally may range from about 2 mesh to about 400 mesh or less on the U.S. Sieve Series; however, in certain circumstances, other sizes or mixtures of sizes may be desired. In particular embodiments, preferred mean particle size distribution ranges are one or more of 6/12, 8/16, 12/20, 16/30, 20/40, 30/50, 40/60, 40/70, or 50/70 mesh. It should be understood that the term "particle" (e.g., proppant particles, gravel particles, and the like), as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be included in certain embodiments of the present disclosure.

Figure 3:
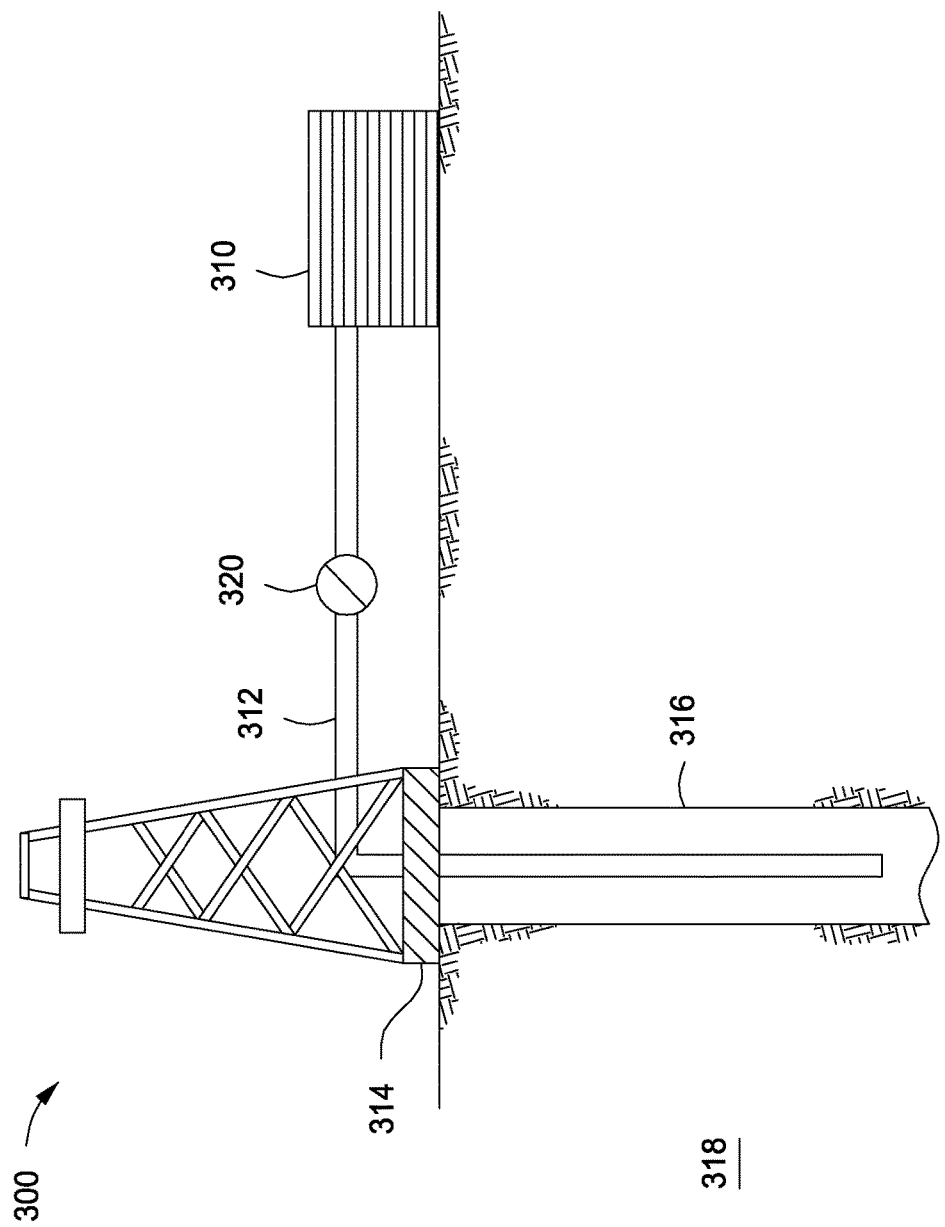
FIG. 3 provides an illustrative representation of a system that may include a particle-handling apparatus according to one or more embodiments.

FIG. 3 provides an illustrative representation a system 300 that can deliver particles to a subterranean formation 318, according to one or more embodiments. It should be noted that while FIG. 3 generally depicts a land-based system, it is to be recognized that like systems may be operated in subsea locations as well. As depicted in FIG. 3, system 300 may include a particle-handling apparatus 310 (e.g., similar to the particle-handling apparatus 100 described in FIG. 1). The particle slurry may be conveyed via line 312 to a wellhead 314, where the particle slurry enters a tubular 316 extending from the wellhead 314 into the subterranean formation 318. Upon being ejected from tubular 316, the particle slurry may subsequently penetrate into subterranean formation 318 (e.g., via a fracture network, not illustrated). The tubular 316 may have a plurality of orifices (not shown) through which the particle slurry may enter the wellbore proximal to a portion of the subterranean formation 318 where the particles are being placed. In some instances, the wellbore may further comprise equipment or tools (not shown) for zonal isolation of the portion of the subterranean formation 318.

The pump 320 may be configured to raise the pressure of the particle slurry to a desired degree before its introduction into tubular 316. Although not depicted in pump 320, the carrier fluid of the particle slurry may, in some embodiments, flow back to wellhead 314 and exit subterranean formation 318. In some embodiments, the carrier fluid that has flowed back to wellhead 314 may subsequently be recovered.

The pump 320 may be a high-pressure pump, a low-pressure pump, or a combination thereof in series. As used herein, the term "high pressure pump" will refer to a pump that is capable of delivering a fluid downhole at a pressure of about 1000 psi or greater. Suitable high pressure pumps will be known to one having ordinary skill in the art and may include, but are not limited to, floating piston pumps and positive displacement pumps. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the particle slurry to the high pressure pump. In such embodiments, the low pressure pump may "step up" the pressure of the particle slurry before it reaches the high pressure pump.

It is to be recognized that system 300 is merely exemplary in nature and various additional components may be present that have not necessarily been depicted in FIG. 3 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and downhole equipment and tools. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 3.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

Embodiments herein include:

Embodiment A

A method comprising: placing particles that are substantially dry in a hopper; conveying the particles from the hopper via a conveyance to an open-air gap; adding a fluid to the particles in the hopper, the particles in the conveyance, or both, thereby reducing an amount of a dust produced at the open-air gap.

Embodiment A may have one or more of the following additional elements in any combination:

Element A1: Wherein the fluid is added to the particles while the particles are contained in the conveyance.

Element A2: Wherein the fluid is added to the particles while the particles are contained in the hopper proximal to the conveyance relative to an inlet of the hopper.

Element A3: Wherein an amount of the fluid added to the particles is less than about 3% by weight of the particles.

Element A4: Wherein the fluid is non-tacky at room temperature.

Element A5: Wherein the fluid comprises water.

Element A6: Wherein the fluid comprises an aqueous miscible fluid.

Element A7: Wherein the fluid comprises at least one selected from the group consisting of a non-aqueous tackifying agent, an aqueous tackifying agent, a silyl-modified polyamide compound, a resin, a crosslinkable aqueous polymer composition, a polymerizable organic monomer composition, a zeta-potential modifying aggregating composition, and a silicon-based resin.

Element A8: Further comprising mixing the particles with a carrier fluid after the step of reducing the amount of dust produced at the open-air gap.

Element A9: Wherein the particles comprise sand.

Element A10: Wherein the particles comprise silica.

Element A11: Wherein the conveyance is a screw auger.

By way of non-limiting example, exemplary combinations applicable to A include: A with A1 and A4; A with A2, A3, and A7; A with A9, A10, and A11; A with A5 and A10; A with A2, A5, and A8; A with A1 and A5; A with A2 and A7.

Embodiment B

A method comprising: placing particles that are substantially dry in a hopper; conveying the particles from the hopper to a mixer via a conveyance, wherein an open-air gap is located between the conveyance and the mixer; adding a fluid to the particles in the hopper, the particles in the conveyance, or both, thereby reducing an amount of a dust produced at the open-air gap; mixing the particles with a carrier fluid and at least one additive in the mixer to produce a particle slurry; and introducing the particle slurry into a subterranean formation.

Embodiment B may have one or more of the following additional elements in any combination:

Element B1: Wherein the fluid is added to the particles while the particles are contained in the conveyance.

Element B2: Wherein the fluid is added to the particles while the particles are contained in the hopper proximal to the conveyance relative to an inlet of the hopper.

Element B3: Wherein an amount of the fluid added to the particles is less than about 3% by weight of the particles.

Element B4: Wherein the fluid is non-tacky at room temperature.

Element B5: Wherein the fluid comprises an aqueous miscible fluid.

Element B6: Wherein the fluid comprises at least one selected from the group consisting of a non-aqueous tackifying agent, an aqueous tackifying agent, a silyl-modified polyamide compound, a resin, a crosslinkable aqueous polymer composition, a polymerizable organic monomer composition, a zeta-potential modifying aggregating composition, and a silicon-based resin.

Element B7: Wherein the fluid comprises the carrier fluid.

Element B8: Wherein the fluid comprises the carrier fluid and the at least one additive.

Element B9: Wherein the fluid comprises the carrier fluid and the at least one additive selected from the group consisting of a non-aqueous tackifying agent, an aqueous tackifying agent, a silyl-modified polyamide compound, a resin, a crosslinkable aqueous polymer composition, a polymerizable organic monomer composition, a zeta-potential modifying aggregating composition, and a silicon-based resin.

Element B10: Wherein the particles comprise sand.

Element B11: Wherein the particles comprise silica.

Element B12: Wherein the conveyance is a screw auger.

By way of non-limiting example, exemplary combinations applicable to B include: B with B1 and B9; B with B6 and B8; B with B2, B3, and B5; B with B3 and B4; B with B6 and B8.

Embodiment C

A method comprising: placing particles that are substantially dry in a hopper; conveying the particles from the hopper to a mixer via a conveyance, wherein an open-air gap is located between the conveyance and the mixer; adding a fluid to the particles in the hopper, the particles in the conveyance, or both, thereby reducing an amount of a dust produced at the open-air gap; and introducing the particles into a subterranean formation.

Embodiment C may have one or more of the following additional elements in any combination:

Element C1: Wherein the fluid is added to the particles while the particles are contained in the conveyance.

Element C2: Wherein the fluid is added to the particles while the particles are contained in the hopper proximal to the conveyance relative to an inlet of the hopper.

Element C3: Wherein an amount of the fluid added to the particles is less than about 3% by weight of the particles.

Element A4: Wherein the fluid is non-tacky at room temperature.

Element C5: Wherein the fluid comprises water.

Element C6: Wherein the fluid comprises an aqueous miscible fluid.

Element C7: Wherein the fluid comprises at least one selected from the group consisting of a non-aqueous tackifying agent, an aqueous tackifying agent, a silyl-modified polyamide compound, a resin, a crosslinkable aqueous polymer composition, a polymerizable organic monomer composition, a zeta-potential modifying aggregating composition, and a silicon-based resin.

Element C8: Further comprising mixing the particles with a carrier fluid after the step of reducing the amount of dust produced at the open-air gap.

Element C9: Wherein the particles comprise sand.

Element C10: Wherein the particles comprise silica.

Element C11: Wherein the conveyance is a screw auger.

By way of non-limiting example, exemplary combinations applicable to C include: C with C1 and C4; C with C2, C5, and C7; C with C9, C10, and C11; C with C6 and C10; C with C3, C5, and C8; C with C1 and C11; C with C2 and C7.

To facilitate a better understanding of the embodiments of the present disclosure, the following example of preferred or representative embodiment is given. In no way should the following example be read to limit, or to define, the scope of the disclosure.

Example

In a particle-handling apparatus similar to that described in FIG. 1, water as added to sand particles at a fluid port arranged in a similar location to fluid port 120a of FIG. 1. The sand having mixed with water visually produced significantly little to no dust in the open-air gap between the screw auger conveyance and the mixer. The amount of water added to the sand was less than about 0.5% by weight of the sand.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   via a supplier, placing particles that are substantially dry in a hopper;
   conveying the particles from the hopper via a conveyance to an open-air gap;
   via a fluid port, adding a fluid to the particles in the hopper, thereby reducing an amount of a dust produced at the open-air gap,
   wherein the fluid comprises an aqueous tackifying agent, and
   wherein the fluid is added to the particles while the particles are contained in the hopper proximal to the conveyance relative to an inlet of the hopper.

2. The method of claim 1, further comprising a step of adding the fluid to the particles while the particles are contained in the conveyance.

3. The method of claim 1, wherein an amount of the fluid added to the particles is less than about 3% by weight of the particles.

4. The method of claim 1, wherein the fluid is non-tacky at room temperature.

5. The method of claim 1, wherein the fluid comprises water.

6. The method of claim 1, wherein the fluid comprises an aqueous miscible fluid.

7. The method of claim 1, wherein the fluid comprises at least one selected from the group consisting of a non-aqueous tackifying agent, a silyl-modified polyamide compound, a resin, a crosslinkable aqueous polymer composition, a polymerizable organic monomer composition, a zeta-potential modifying aggregating composition, and a silicon-based resin.

8. The method of claim 1 further comprising:
   via a mixer, mixing the particles with a carrier fluid after the step of reducing the amount of dust produced at the open-air gap.

9. The method of claim 1, wherein the particles comprise sand.

10. The method of claim 1, wherein the particles comprise silica.

11. The method of claim 1, wherein the conveyance is a screw auger.

* * * * *